United States Patent
Tiid et al.

(10) Patent No.: US 7,374,131 B2
(45) Date of Patent: May 20, 2008

(54) SUPPORT DEVICE FOR A GALLEY

(75) Inventors: Leo Tiid, Neu Wulmstorf (DE); Lars Lehmann, Hamburg (DE); Thomas Hoffmann, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/519,741

(22) Filed: Sep. 12, 2006

(65) Prior Publication Data

US 2007/0063101 A1   Mar. 22, 2007

Related U.S. Application Data

(63) Continuation of application No. PCT/EP2005/002550, filed on Mar. 10, 2005.

(60) Provisional application No. 60/598,269, filed on Aug. 3, 2004.

(30) Foreign Application Priority Data

Mar. 12, 2004   (DE) .................. 10 2004 012 262

(51) Int. Cl.
B64D 11/00   (2006.01)
F16B 23/00   (2006.01)

(52) U.S. Cl. .................. 244/118.5; 244/131; 403/369; 411/398; 411/539

(58) Field of Classification Search ............ 244/118.2, 244/118.5, 118.6, 117 R, 118, 122 R, 129; 403/DIG. 8, 75, 78, 150, 164, 165, 408.1; 411/539, 398
See application file for complete search history.

(56) References Cited

U.S. PATENT DOCUMENTS

| | | | | |
|---|---|---|---|---|
| 1,097,185 A | * | 5/1914 | Oehrle | 411/337 |
| 2,397,290 A | * | 3/1946 | Rasmussen | 277/606 |
| 2,940,784 A | * | 6/1960 | Fell | 74/89.35 |
| 3,072,415 A | * | 1/1963 | Lombard et al. | 277/622 |
| 3,455,362 A | * | 7/1969 | Mohrman | 411/103 |
| 3,669,393 A | * | 6/1972 | Paine et al. | 248/188.4 |
| 3,725,993 A | * | 4/1973 | Siler | 29/271 |
| 4,309,123 A | * | 1/1982 | Moore | 403/408.1 |
| 4,456,206 A | | 6/1984 | Tijssen et al. | |
| 4,613,000 A | * | 9/1986 | Moore | 173/217 |
| 4,964,594 A | * | 10/1990 | Webb | 244/131 |
| 5,083,726 A | * | 1/1992 | Schurr | 244/118.6 |
| 5,083,727 A | | 1/1992 | Pompei et al. | |
| 5,141,357 A | * | 8/1992 | Sherman et al. | 403/408.1 |
| 5,222,694 A | | 6/1993 | Smoot et al. | |
| 5,511,760 A | * | 4/1996 | Kambara | 248/650 |
| 5,520,357 A | * | 5/1996 | Payne et al. | 244/118.1 |
| 6,024,330 A | * | 2/2000 | Mroz et al. | 248/188.4 |

(Continued)

FOREIGN PATENT DOCUMENTS

DE   200 05 265 U1   5/2000

*Primary Examiner*—Tien Dinh
*Assistant Examiner*—Joseph W Sanderson
(74) *Attorney, Agent, or Firm*—Lerner, David, Littenberg, Krumholz & Mentlik, LLP

(57) ABSTRACT

A support device of cabin elements in an airplane. According to an exemplary embodiment of the present invention, a support device is provided into which a threaded bushing (7) can be screwed into a fastening element (6) in order to adjust the distance in z-direction of the airplane. Thus, a stepless adjustment is made possible in an advantageous way.

2 Claims, 4 Drawing Sheets

U.S. PATENT DOCUMENTS

| | | | |
|---|---|---|---|
| 6,050,034 A * | 4/2000 | Krinner | 52/155 |
| 6,318,672 B1 * | 11/2001 | Traylor | 244/118.5 |
| 6,543,956 B2 * | 4/2003 | Schwarzbich | 403/167 |
| 6,848,853 B2 * | 2/2005 | Yamada | 403/4 |
| 7,037,027 B2 * | 5/2006 | Steinbeck | 403/408.1 |

* cited by examiner

SUPPORT DEVICE FOR A GALLEY

CROSS-REFERENCE TO RELATED APPLICATIONS

The present application is a continuation of a national phase entry under 35 U.S.C. § 371 of International Application No. PCT/EP2005/002550 filed Mar. 10, 2005, published in English, which claims priority from U.S. Provisional Application No. 60/598,269 filed Aug. 3, 2004 and German Patent Application No. 10 2004 012 262.8 filed Mar. 12, 2004, all of which are incorporated herein by reference.

BACKGROUND OF THE INVENTION

The present invention relates to fastening a galley or similar equipment in an airplane. The present invention particularly relates to a support device for fastening an arrangement on a horizontal surface in an airplane, to a method for fastening an arrangement with a thread at a recess in a horizontal surface of an airplane as well as to a galley for fastening at a horizontal surface of an airplane.

Particularly, an economic way of mounting and retrofitting cabin components for galleys is desirable in the construction of modern passenger airplanes. Moreover, it has to be made sure that cabin components are fastened securely in order to guarantee a secure fixing of the cabin components, for instance in case of a sudden maneuver of the airplane.

Generally, in today's galley hardpoint fasteners, spacer plates are used in order to adjust a distance to the horizontal surface of the airplane onto which the corresponding cabin component or galley is to be fastened. During the installation it is therefore necessary for the mechanic to estimate the corresponding spacer plates or washers for adjusting a position of the galley in z-axis, i.e. in about a right angle to the horizontal surface of the airplane, and that he then inserts the spacer plates. Then, the galley is fastened. If the mechanic will detect then that the estimation was wrong, it will be necessary to lift the galley with an auxiliary tool and to change the arrangement of the spacer plates. This will make the installation very complicated and costly. Moreover, the z-position of the galley can only be adjusted incrementally and not steplessly. Altogether, such hardpoint galley fasteners require a very time-consuming installation.

It is an object of the present invention to provide an enhanced galley fastener for an airplane.

SUMMARY OF THE INVENTION

According to an exemplary embodiment of the present invention, a support device is provided for fastening an arrangement, such as cabin components, seats or a galley, on a horizontal surface of an airplane. Relating to this, the arrangement comprises a thread pointing at the horizontal surface during the installation. The horizontal surface comprises a recess, such as a bore. The support device according to the present invention comprises a threaded bushing which can be screwed into the thread of the arrangement. The threaded bushing comprises a thread bushing head. In an advantageous embodiment, the thread bushing head could for example be larger than the recess in the surface. By correspondingly screwing the threaded bushing into the thread of the arrangement, a distance between the horizontal surface and the arrangement can be adjusted steplessly. Thus, the z-position of a galley can be adjusted steplessly in an advantageous way. Furthermore, this support device can be installed more easily, since it is not necessary, as in case of the above-mentioned prior art, to lift the galley by means of an auxiliary tool in order to adjust the z-position, but the z-position can be adjusted steplessly by correspondingly screwing the threaded bushing into or out of the thread of the arrangement.

According to an additional exemplary embodiment of the present invention, the threaded bushing comprises a longitudinal bore, into which a first eccentric is inserted. This first eccentric in turn comprises a longitudinal bore, into which a second eccentric is inserted. According to this exemplary embodiment of the present invention, an x- and y-position of the arrangement or the galley, respectively, can be adjusted advantageously. The x- and y-directions are parallel to the horizontal surface. Thus the position of the arrangement can be adjusted in a simple way. This in turn makes a faster and therefore more economic installation in the airplane possible.

According to an additional exemplary embodiment of the present invention, a bushing is provided to be arranged between the thread bushing head and the recess. Advantageously, a sealing ring is further provided to be arranged between the bushing and the recess. So, for example, the recess can be sealed. If for example a galley is mounted on a cabin floor of the passenger cabin of the airplane, for example spilled liquids can be prevented simply and effectively from leaking through the recess.

According to an additional exemplary embodiment of the present invention, the support device is specifically implemented for fastening a galley on the floor of a passenger cabin in an airplane.

According to an additional exemplary embodiment of the present invention, a method for fastening an arrangement having a thread in a recess in a horizontal surface of an airplane is provided. According to this method, a threaded bushing is screwed into the arrangement. The threaded bushing can for example be supported by the horizontal surface of the airplane or by a bushing which is inserted into the recess of the horizontal surface. A distance between the arrangement and the surface can now be adjusted easily by screwing the threaded bushing into or out of the thread. According to this exemplary embodiment of the present invention, a simple and time-effective process is indicated for installing for example a galley in an airplane and for adjusting the z-position of the galley easily and steplessly.

An additional exemplary embodiment of the method of the present invention is indicated in more detail herein.

According to an additional exemplary embodiment of the present invention, a galley is provided, which can be mounted easily on a horizontal surface of an airplane and which can be adjusted steplessly with reference to the z-position of the galley on, for example, the floor of the passenger cabin in the airplane. In connection with this, it is necessary to point out, that the term galley also comprises cabin components such as closets, luggage compartments, lavatory elements and seats of the airplane.

In the following, exemplary embodiments of the present invention will be described with reference to the FIGS. 1 to 4.

BRIEF DESCRIPTION OF THE DRAWINGS

In the following description of FIGS. 1 to 4, the same reference numbers are used for the same or corresponding elements.

DETAILED DESCRIPTION

Figure 1:
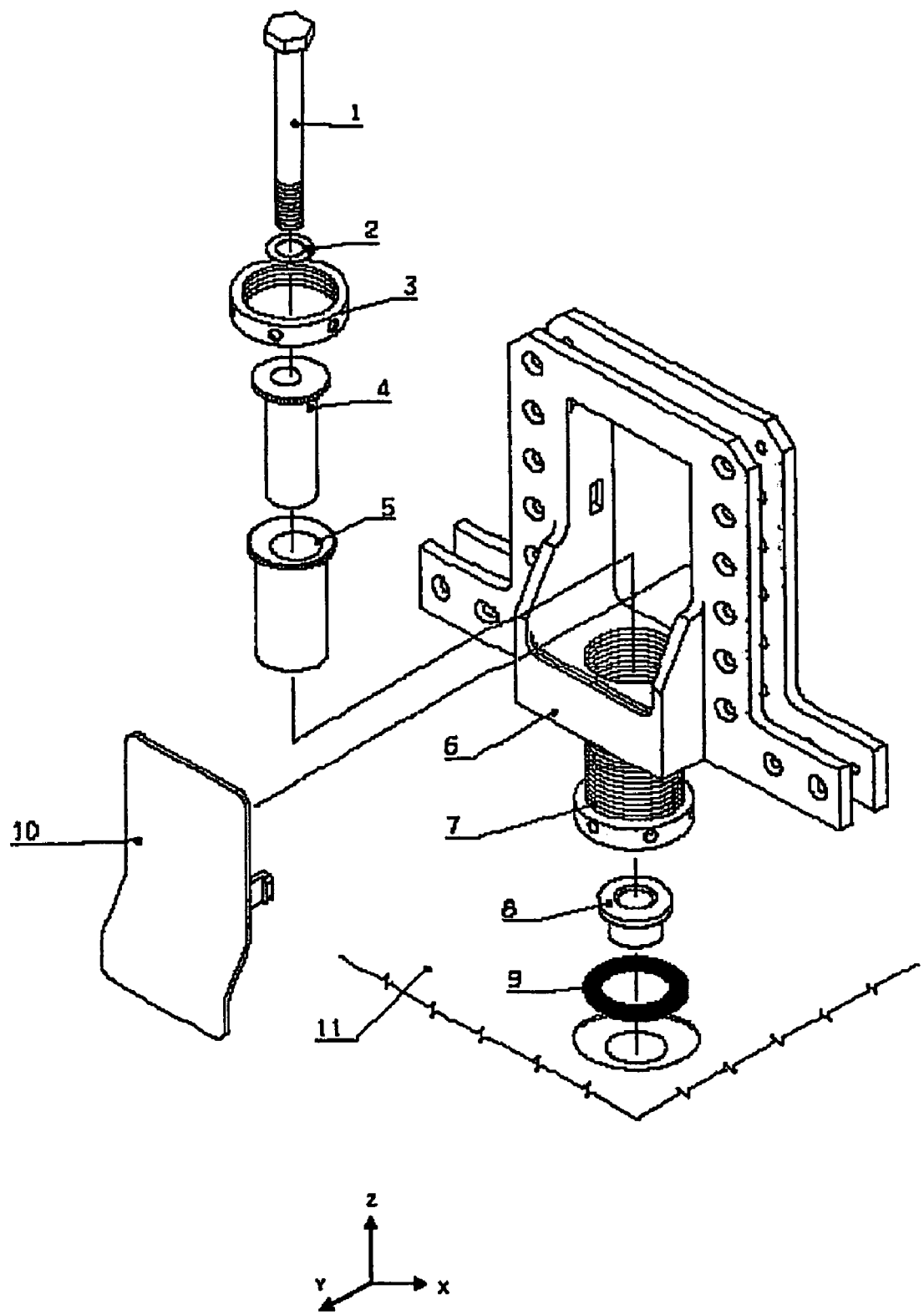
FIG. 1 shows a three-dimensional exploded diagram of an exemplary embodiment of a support device for a galley according to an exemplary embodiment of the present invention.

FIG. 1 shows a three-dimensional exploded diagram of the support device for a galley according to an exemplary embodiment of the present invention. The support device can also be integrally formed as a part of the galley or the corresponding cabin component, for example by gluing or with the help of a riveted joint.

Reference number 1 denotes a stud or a bolt which can be put through a washer 2, a ring nut 3, a first eccentric 4, a second eccentric 5, a threaded bushing 7, a bushing 8 and an sealing ring 9 in order to protrude through a recess in the floor 11 of the passenger cabin. On the other side of the recess in the floor 11, for example, a bow nut may be provided. There also can be a thread in the recess in the floor 11 in order to fasten the bolt 1. The term floor as it is used in the present invention means a structure of an airplane which has a corresponding strength. Reference number 6 denotes a fastening element of the galley. This fastening element 6 can for example be screwed or riveted to the galley. But element 6 can also be an integral part of the galley. Reference number 10 in FIG. 1 denotes a cover which can be inserted into an opening in the fastening element 6 of the galley and which can be kept in place there by means of a snap fit connection. The cover 10 can for example be used as a mask for parts of the support device, comprising the bolt 1, the washer 2, the ring nut 3, the eccentrics 4 and 5, a thread in the fastening element 6, the threaded bushing 7, the bushing 8 as well as the sealing ring 9.

As can be seen in FIG. 1, the bushing 8 is inserted into the floor 11. Radially across the bushing 8, for example, the sealing ring 9 in the form of an O-ring will be positioned, which will securely seal the structure of the airplane by resting on the floor 11. Seals like this are especially advantageous with galley hardpoint fasteners in order to keep spilled liquids (such as beverages) from leaking into the structure of the airplane. The threaded bushing 7 is screwed into a galley-side thread in the fastening element 6 which may for example be designed as a wall fitting. The outer eccentric 5 (eccentric bushing) and the inner eccentric 4 (eccentric bushing) are fit into the threaded bushing 7. By twisting the eccentric 4 in relation to the eccentric 5, a sideways adjustment (tolerance balance) along the x- and y-directions of the airplane is made possible. The coordinate system of the airplane is shown in FIG. 1 below the support device.

In order to fasten the galley on the floor, the bolt 1 is put through the elements marked with the reference numbers 2, 4, 5, 7 and 8 and can then be bolted to a structure of the airplane by means of a bow nut, which is not shown in FIG. 1. The ring nut 3, which can also be denoted as a locking nut, is used to fix the position of the galley in z-direction, after the z-direction of the galley has been adjusted by correspondingly screwing the threaded bushing 7 into or out of the thread of the fastening element 6.

The cover 10, which can also be denoted as a cover plate, advantageously offers protection of the support device's structure against dirt and liquids and from view.

On the basis of the following mounting description, the function and the involved advantages of the present invention will be described.

After the galley has been brought to the corresponding position of installation in the airplane, the bushing 8 will be mounted to the O-ring and the support device according to the invention, which can also be denoted as a galley hardpoint fastener, will be bolted to the floor 11 of the structure of the airplane by means of the bolt 1. Then the mechanic will make a visual examination in order to check the fit of the galley in the airplane. If the result of the visual examination shows that the galley has to be adjusted concerning the z-coordinate, i.e. if the distance between the floor 11 and the fastening element 6 has to be changed, the locking ring 3 will be loosened. This can be done for example with the help of an auxiliary tool, whose hole pattern fits to the hole pattern of the locking ring or ring nut 3. By turning the threaded bushing 7, for example with an auxiliary tool which is designed to fit with the hole pattern of the threaded bushing 7, the galley will now be displaced or adjusted, respectively, in z-direction of the airplane. In other words, the galley will be lifted or lowered by turning the threaded bushing 7. The direction of turning will determine whether the galley will be lifted or lowered.

Since a plurality of such support devices can be provided for a galley, for example 8 to 10 galley hardpoint fasteners per galley, the position of the individual support devices along the z-axis can be adjusted independently according to the present invention, unlike the way of installation according to the prior art where it is necessary to lift the galley by means of an auxiliary tool.

After the galley has been positioned in the airplane, the locking ring 3 will be tightened against the galley-sided fastening element so that the position of the fastening element and thus of the galley is fixed in z-direction. Finally, the cover plate 10 will be pressed onto the fastening element 6 as a protection against dirt, liquid and from view.

Figure 2:
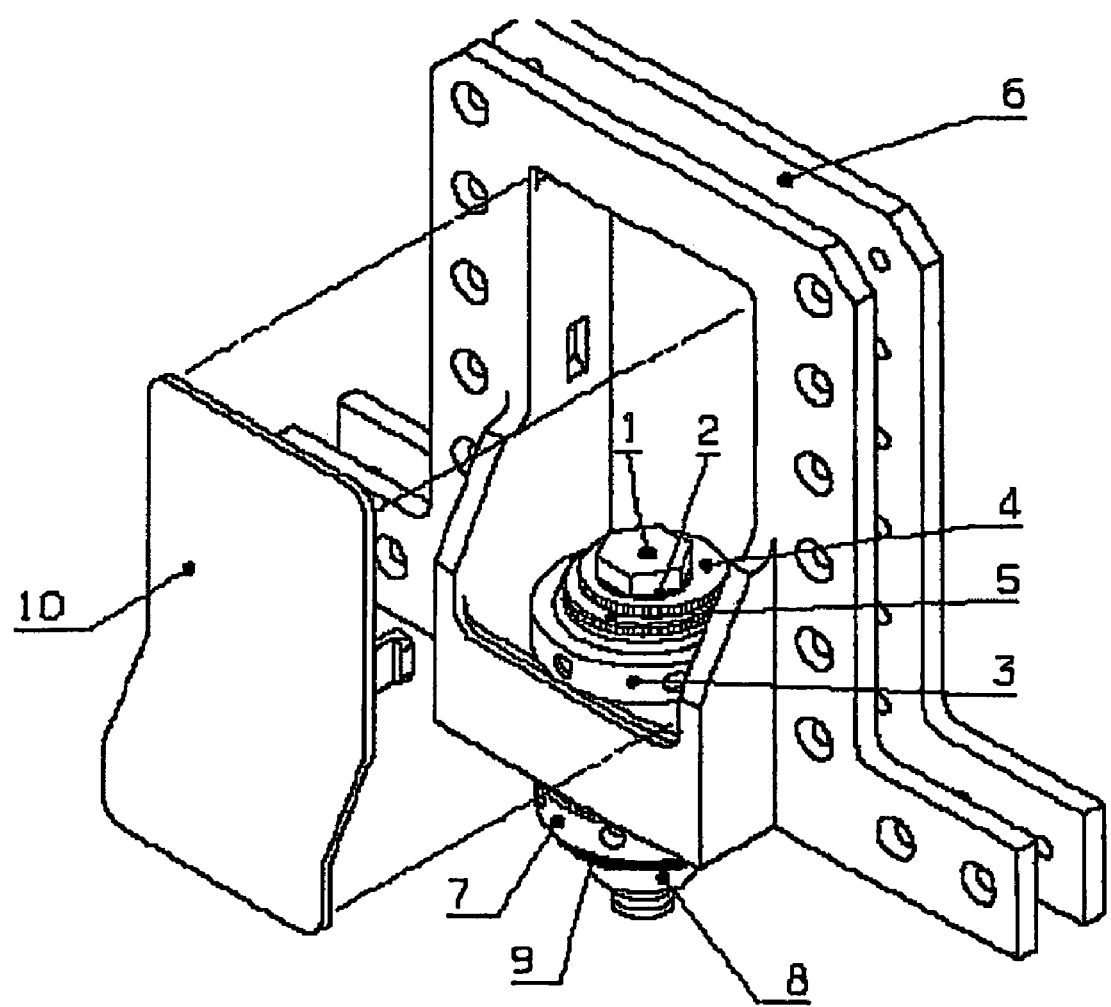
FIG. 2 shows an additional three-dimensional view, depicting the support device of FIG. 1 after the installation.
Figure 2:
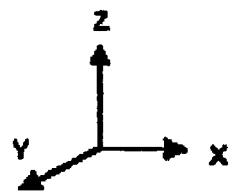

FIG. 2 shows the support device of FIG. 1 in pre-assembled condition. Like in FIG. 1, in FIG. 2 the coordinate system of the airplane is shown below the support device. As can be seen in FIG. 2, the ring nut 3, which may also be denoted as locking ring, is supported by material of the fastening element 6, which surrounds the thread. When the cover 10 is removed, the ring nut 3 as well as a head of the threaded bushing 7 are accessible to the mechanic so that, for example, the mechanic can operate or turn, respectively, the ring nut 3 as well as the threaded bushing 7 by means of a corresponding auxiliary tool.

When the cover 10 is pressed onto the fastening element 6, the support device is basically encapsulated.

Figure 3:
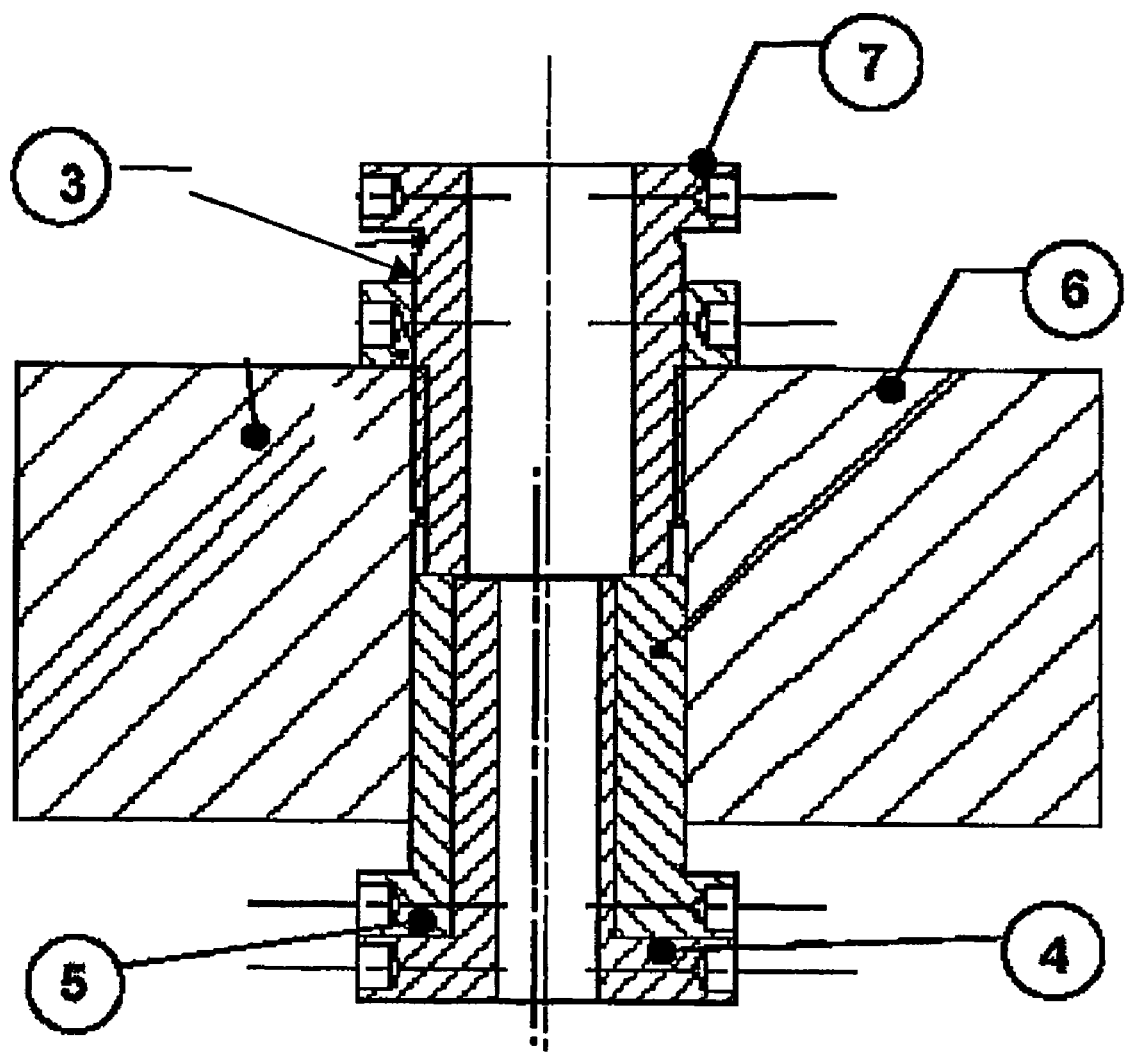
FIG. 3 shows a sectional view of a support device according to an additional exemplary embodiment of the present invention.

FIG. 3 shows a sectional view of an exemplary embodiment of a support device according to the present invention. In opposition to the exemplary embodiments shown in FIG. 1 and 2, it is not intended in the exemplary embodiment shown in FIG. 3 to lead the eccentrics 4 and 5 through bores in the threaded bushing 7. In opposition to that, the eccentric 5, into whose eccentric longitudinal bore a further eccentric 4 is inserted, is supported at one end of the threaded bushing 7.

As can be seen in FIG. 3, the threaded bushing 7 is screwed into a thread of the fastening element 6. In addition, a ring nut 3 is provided on an external thread of the threaded bushing 7, which is provided to fix the threaded bushing 7. By screwing the threaded bushing 7 into or out of the fastening element 6, a distance between, for example, the floor and the fastening element 6 can be adjusted. In order to fix this z-position, when finally adjusting the threaded bushing 7, the ring nut 3 will be bolted or tightened, respectively, onto the fastening element 6 so that the threaded bushing 7 is fixed to the ring nut 7.

An x- and y-position (in FIG. 3 the coordinate system of the airplane is shown below the illustrated support device) can be realized by correspondingly turning the eccentric 4 in relation to the eccentric 5. A bolt or a rivet may then be put through the bore through the eccentric 4 and through the bore in the threaded bushing 7, wherein the rivet or bolt can then be fixed correspondingly on the floor.

Figure 4:
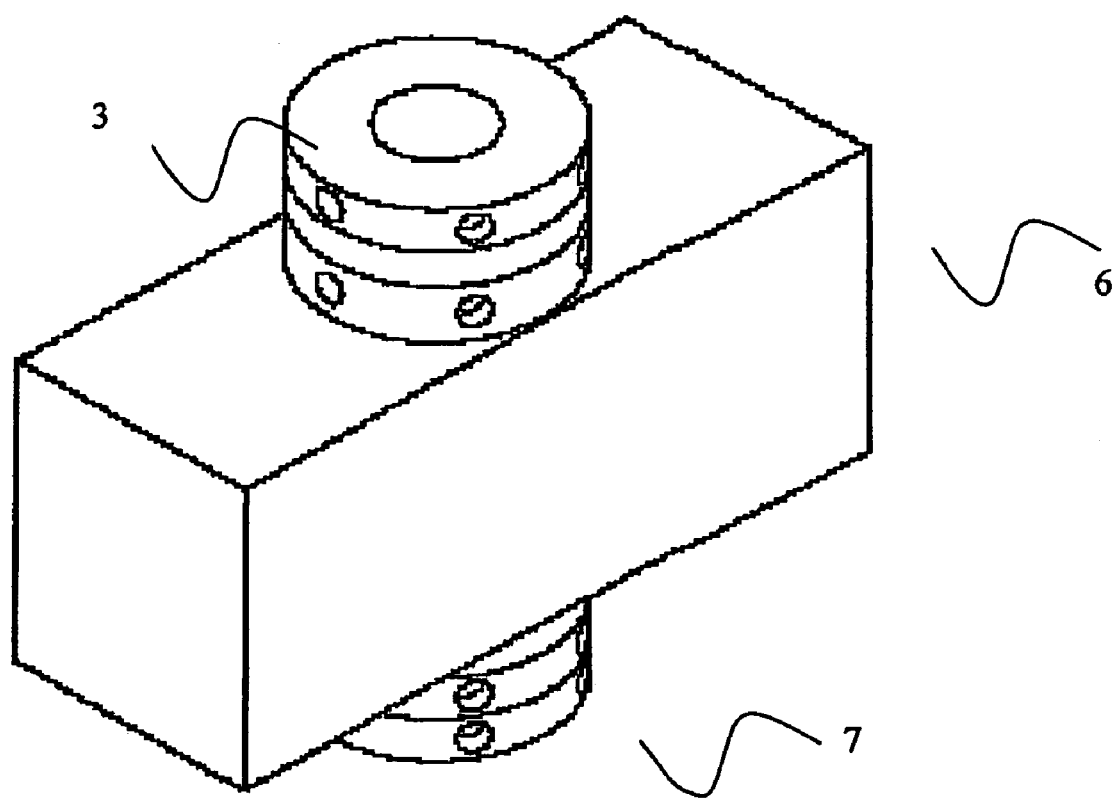
FIG. 4 shows a three-dimensional view of an additional exemplary embodiment of the support device according to the present invention.
Figure 4:
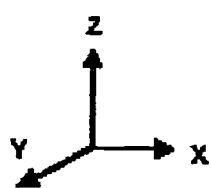

FIG. 4 shows an additional three-dimensional view of a support device according to an additional exemplary embodiment of the present invention.

As can be seen in FIG. 4, a plurality of ring nuts 3 are provided in the exemplary embodiment shown in FIG. 4, as well as a threaded bushing, onto which a plurality of ring nuts are bolted. Basically, FIG. 4 shows a three-dimensional view of FIG. 3.

As can be seen especially in FIG. 3 and 4, in opposition to the exemplary embodiment shown in FIG. 1 and 2, the arrangement of the eccentric bushings for x-/y-adjustment and of the threaded bushing 7 can be realized radially as well as axially. In the exemplary embodiment shown in FIG. 3, the eccentrics 4 and 5 and the threaded bushing 7 are arranged axially, thus an upsized total height of the support device in z-direction can be implemented advantageously.

The above-described exemplary embodiments make it possible in an advantageous way to enhance the economic efficiency of the installation of the fastening system for a galley in an airplane, and the time needed for the installation will be shortened. In an advantageous way, the support device according to the invention will be brought into the airplane in a pre-assembled condition as it is shown for example in FIG. 2, but without the bolt, the O-ring and the bushing. As the elements of the fastening system have already been pre-assembled, there is less danger of losing individual elements during the installation, which otherwise would have to be searched laboriously. Furthermore, the support device according to the present invention offers advantageously an enhanced way of installation with the help of stepless adjustment, since a stress-free installation of the units is possible.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A support device for spacing an arrangement on a horizontal surface of an airplane, wherein the arrangement comprises a thread pointing towards the horizontal surface, wherein the horizontal surface comprises a recess, wherein the support device comprises:
    a threaded bushing to be screwed into the thread of the arrangement;
    wherein the threaded bushing comprises a thread bushing head, which is adapted for abutting at a horizontal surface at least in an indirect manner; and
    wherein a distance between the horizontal surface and the arrangement is steplessly adjustable by screwing the threaded bushing into the thread of the arrangement,
    wherein the threaded bushing comprises a first longitudinal bore;
    wherein a first eccentric is provided in the first longitudinal bore;
    wherein the first eccentric comprises a second longitudinal bore;
    wherein a second eccentric is provided in the second longitudinal bore;
    wherein the second eccentric comprises a third longitudinal bore;
    wherein a bolt is provided in the third longitudinal bore, which bolt holds the arrangement in position on the horizontal surface in connection with a thread in the first recess or with a corresponding nut; and
    wherein a fixing position of the arrangement in relation to the recess is adjustable in at least one direction (x,y) parallel to the horizontal surface by turning the first and second eccentric,
    wherein a non-threaded bushing is provided to be arranged in the recess;
    wherein the non-threaded bushing is provided to be arranged between the thread bushing head and the recess;
    wherein a sealing ring is provided to be arranged between the non-threaded bushing and the recess in order to seal the recess.

2. The support device according to claim 1,
    wherein the support device is implemented to fasten a galley on a floor of a passenger cabin in an airplane.

* * * * *